US006810324B1

(12) United States Patent
Nadkarni

(10) Patent No.: US 6,810,324 B1
(45) Date of Patent: Oct. 26, 2004

(54) SUBSTITUTION OF HIGH QUALITY POSITION MEASUREMENTS WITH UPGRADED LOW QUALITY POSITION MEASUREMENTS

(75) Inventor: Vivek Bhalchandra Nadkarni, Sunnyvale, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

(21) Appl. No.: 10/165,712

(22) Filed: Jun. 6, 2002

(51) Int. Cl.[7] .......................... G01C 21/00; G01C 21/30
(52) U.S. Cl. ................. 701/207; 701/200; 342/357.02; 342/357.04; 342/357.15; 342/358
(58) Field of Search ............................... 701/200, 224, 701/226, 207, 209, 210, 213, 214, 215, 216; 342/357.08, 357.12, 352, 357.01, 357.02, 357.03, 357.04, 357.06, 357.14, 357.15, 358; 375/147–150

(56) References Cited

U.S. PATENT DOCUMENTS

| | | | |
|---|---|---|---|
| 5,590,043 A | 12/1996 | McBurney | 701/207 |
| 5,740,048 A | 4/1998 | Abel et al. | 701/200 |
| 6,018,704 A * | 1/2000 | Kohli et al. | 702/149 |
| 6,480,145 B1 * | 11/2002 | Hasegawa | 342/357.06 |
| 2002/0015439 A1 * | 2/2002 | Kohli et al. | 375/148 |
| 2003/0058163 A1 * | 3/2003 | Zimmerman et al. | 342/357.08 |

FOREIGN PATENT DOCUMENTS

JP  02124420 A  *  5/1990  .......... G10C/21/00
JP  2001059729 A  *  3/2001  .......... G10C/21/00

* cited by examiner

Primary Examiner—Jacques H. Louis-Jacques
(74) Attorney, Agent, or Firm—Boris G. Tankhilevich

(57) ABSTRACT

A method for substituting at least one high quality position measurement with a set of upgraded low quality position measurements comprising the steps of: selecting a high quality source of position measurements of an object; obtaining at least one high quality position measurement of the object by using the high quality source; wherein each high quality position measurement of the object satisfies the threshold of acceptability requirement for the object; saving at least one high quality position measurement of the object taken at at least one high quality epoch timing coordinate; selecting a low quality source of position measurements of the object; obtaining at least one low quality position measurement of the object using the low quality source; if at least one high quality position measurement of the object is available and substantially recent, using at least one high quality position measurement of the object for navigation purposes of the object; if each high quality position measurement of the object is unavailable, or is available but is not substantially recent, upgrading at least one low quality position measurement of the object by using at least one high quality position measurement of the object to obtain at least one upgraded low quality position measurement that satisfies the threshold of acceptability requirement for the object; and using at least one upgraded low quality position measurement of the object that satisfies the threshold of acceptability requirement for the object in place of at least one high quality position measurement for navigation purposes of the object.

35 Claims, 4 Drawing Sheets

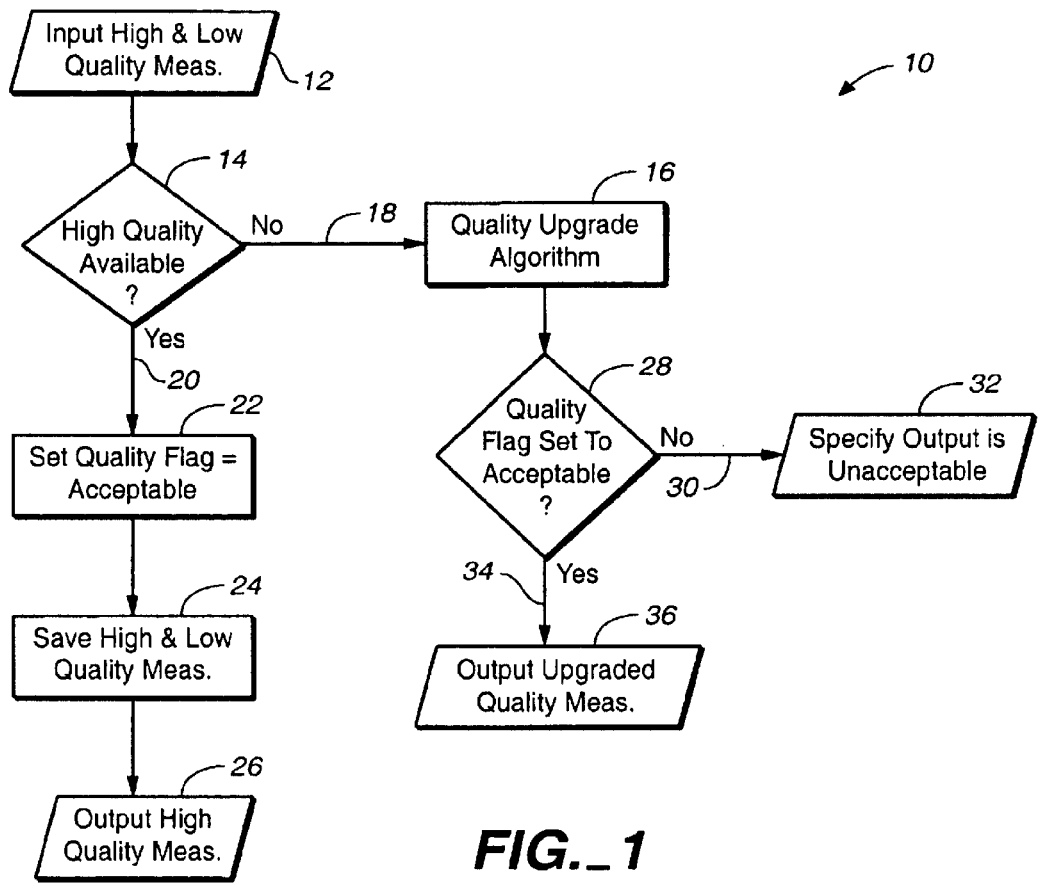
FIG._1

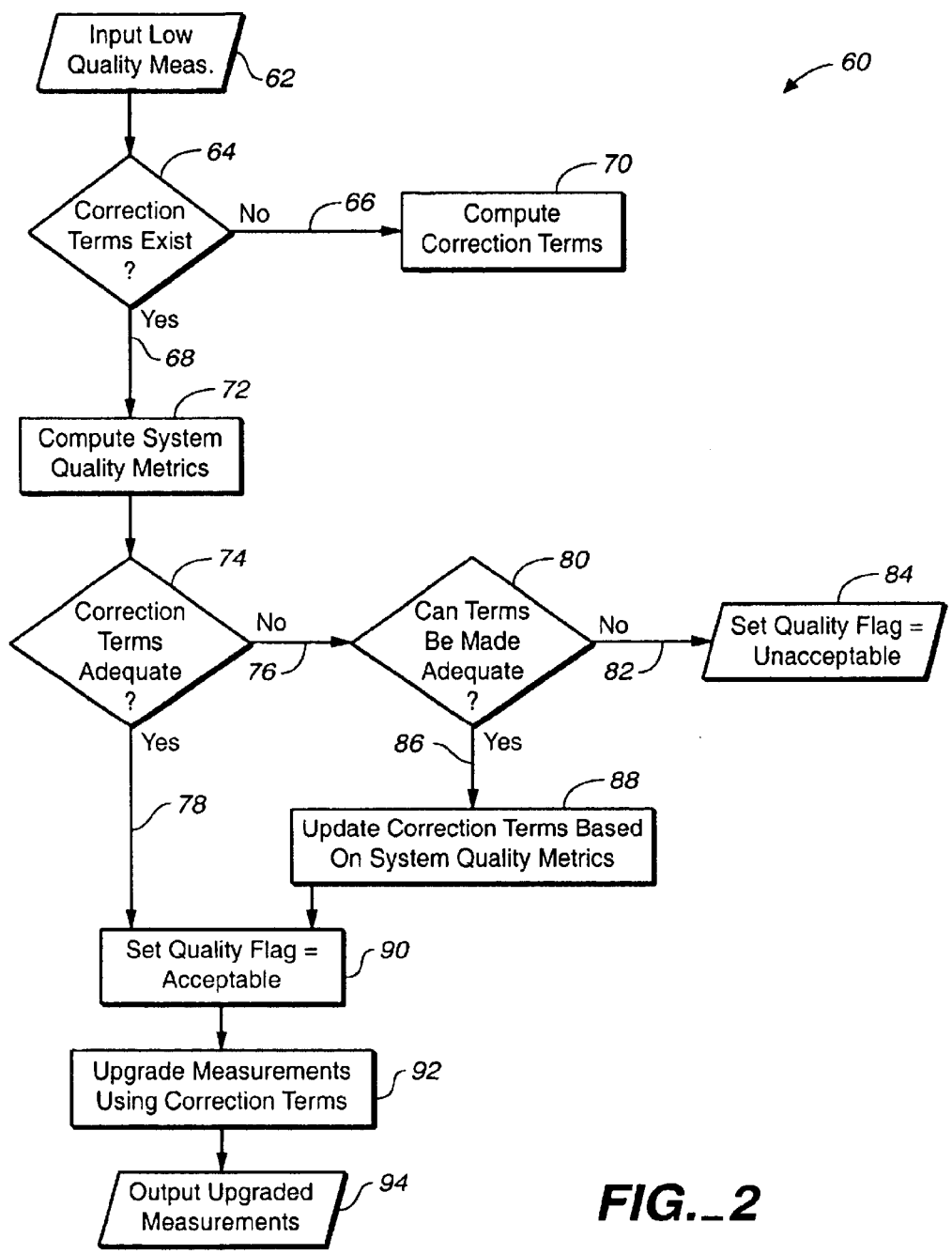
FIG._2

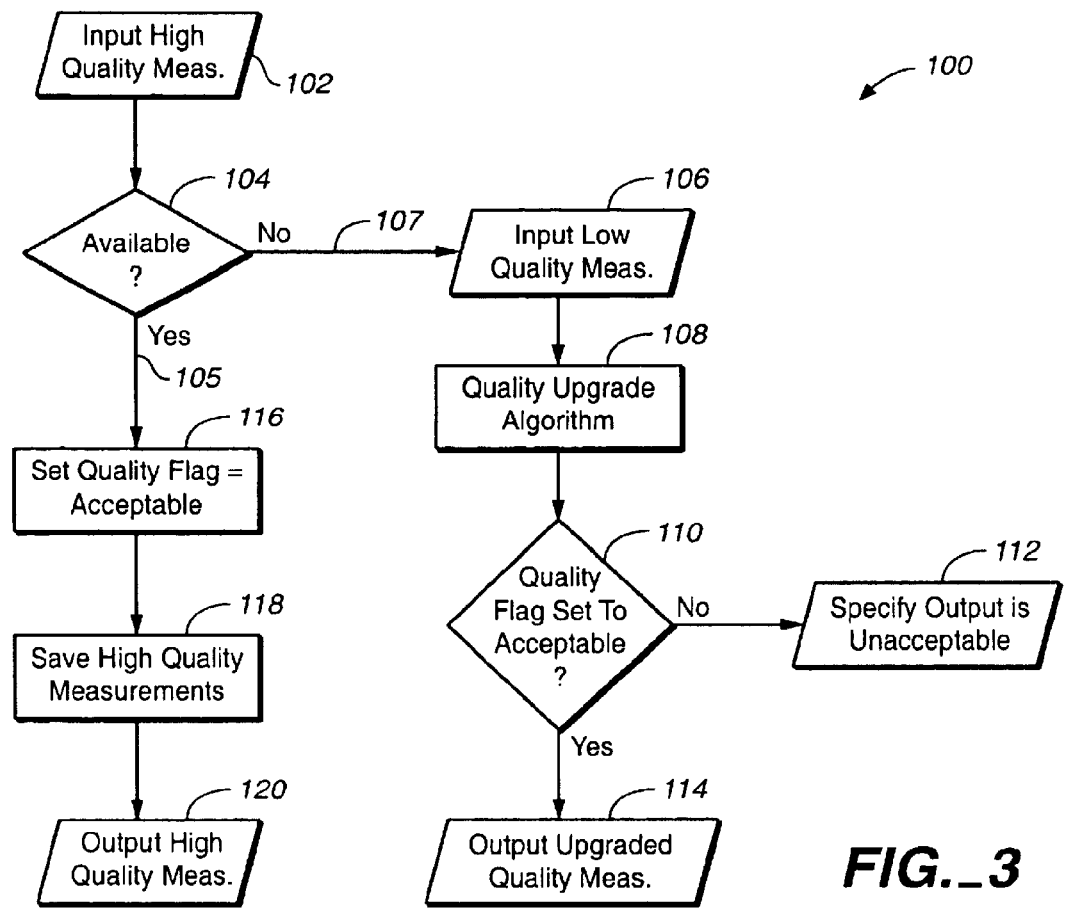
FIG._3

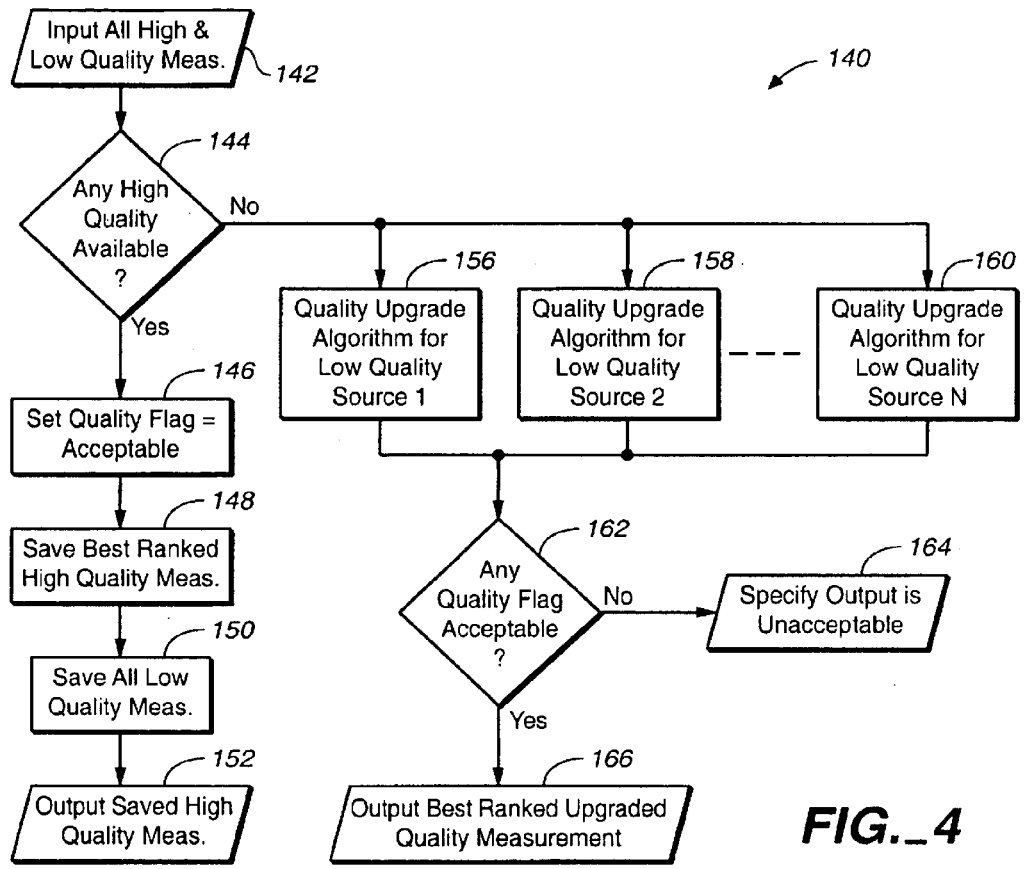
FIG._4

SUBSTITUTION OF HIGH QUALITY POSITION MEASUREMENTS WITH UPGRADED LOW QUALITY POSITION MEASUREMENTS

BACKGROUND OF THE INVENTION

1. Field of the Invention

The present invention is in the field of position measurements, and more specifically, is in the field of improving the quality of position measurements.

2. Discussion of the Prior Art

In the prior art, there are several methods of improving position measurements by performing the operations of filtering and/or smoothing of obtained position measurements. The prior art also discusses different ways of improving measurements by performing sensor fusion, that is by combining a number of measurements performed by a plurality of sensors in order to obtain a higher quality position measurement as compared with a position measurement obtained by a single sensor. For instance, the well known in the art Kalman filter significantly increases the accuracy of Global Position System (GPS) position measurements by combining Global Position System (GPS) measurements and the Inertial Navigation System (INS) measurements.

However, the prior art methods of improving the quality of position measurements do not teach how to improve the quality of position measurements of an object in a situation when a previously available source of high quality position measurements becomes unavailable, and only a low quality source of position measurements is available.

What is needed is a method for substituting a high quality source of position measurements with a low quality source of position measurements when a previously available source of high quality position measurements becomes unavailable, while minimizing the degradation in quality of position measurements due to switch from the high quality source of position measurements to the low quality source of position measurements.

SUMMARY OF THE INVENTION

To address the shortcomings of the available art, the present invention provides a method for substituting a high quality source of position measurements with a low quality source of position measurements when a previously available source of high quality position measurements becomes unavailable.

One aspect of the present invention is directed to a method for substituting at least one high quality position measurement with a set of upgraded low quality position measurements. In one embodiment, the method comprises the following steps: selecting a high quality source of position measurements of an object; obtaining at least one high quality position measurement of the object obtained by using the high quality source; wherein at least one high quality position measurement of the object includes a high quality epoch timing coordinate indicative of when the high quality position measurement of the object was taken; wherein a threshold of acceptability is defined as a bound between an "acceptable" error in a position measurement of the object and an "unacceptable" error in the position measurement of the object; and wherein the high quality position measurement of the object includes the acceptable error in the high quality position measurement of the object; and wherein each high quality position measurement of the object satisfies the threshold of acceptability requirement for the object; saving at least one high quality position measurement of the object taken at at least one high quality epoch timing coordinate; selecting a low quality source of position measurements of the object; and obtaining at least one low quality position measurement of the object using the low quality source; wherein at least one low quality position measurement of the object includes a low quality epoch timing coordinate indicative of when at least one low quality position measurement of the object was taken.

In one embodiment of the present invention, if at least one high quality position measurement of the object is available and substantially recent, the method of present invention further includes the step of using at least one high quality position measurement of the object for navigation purposes of the object. In this embodiment, the high quality measurement is available if the source of high quality position measurements is generating a stream of high quality position measurements, and the high quality position measurement is unavailable if the source of high quality position measurements stops generating the stream of high quality measurements. The high quality position measurement is substantially recent if a rate of updating the high quality position measurement is substantially sufficient to obtain a substantially accurate position measurement of the object.

If, on the other hand, each high quality position measurement of the object is unavailable, or is available but is not substantially recent, the method of present invention further includes the following steps: upgrading at least one low quality position measurement of the object by using at least one high quality position measurement of the object to obtain at least one upgraded low quality position measurement of the object; and using at least one upgraded low quality position measurement of the object in place of at least one high quality position measurement for navigation purposes of the object, if the upgraded low quality position measurement of the object being considered satisfies the threshold of acceptability requirement for the object.

In one embodiment, the method of the present invention for substituting at least one high quality position measurement with a set of upgraded low quality position measurements further includes the step of setting the threshold of acceptability of the error in the position measurement of the object. In one embodiment of the present invention, the threshold of acceptability of the error in the position measurement of the object is set to be a standard deviation of a set of position measurement errors taken over a statistically significant time period. In another embodiment of the present invention, the threshold of acceptability of the error in the position measurement of the object is set to be a maximum measurement error that is acceptable for a given navigation application of the object.

In one embodiment of the present invention, the step of selecting the high quality source of position measurements further includes the step of providing the high quality source of position measurements selected from the group consisting of: {a carrier differential SATPS; a code differential SATPS; an autonomous SATPS; an Inertial Navigation System (INS) having a high accuracy (HAINS); a high quality source including the HAINS and the carrier differential SATPS; a high quality source including the HAINS and the code differential SATPS; and a high quality source including the HAINS and the autonomous SATPS}.

In one embodiment of the present invention, the step of selecting the low quality source of position measurements of the object further includes the step of providing the low quality source of position measurements selected from the group consisting of: {a carrier differential SATPS; a code differential SATPS; an autonomous SATPS; and an Inertial Navigation System (INS) having a low accuracy (LAINS)}.

Another aspect of the present invention is directed to a method for substituting at least one high quality position measurement with a set of upgraded low quality position measurements, wherein there are a plurality of sources of low quality measurements are available. In one embodiment, the method of the present invention comprises the following steps: selecting at least one high quality source of position measurements of an object; obtaining at least one high quality position measurement of the object by using at least one high quality source of high quality position measurements; saving at least one high quality position measurement of the object at at least one high quality epoch timing coordinate; selecting at least one low quality source of position measurements of the object; and obtaining at least one low quality position measurement of the object by using at least one low quality source.

In one embodiment of the present invention, if at least one high quality position measurement of the object obtained by at least one high source position measurement is available and substantially recent, the method of the present invention further includes the step of using at least one high quality position measurement of the object for navigation purposes of the object. In this embodiment, the high quality measurement is available if at least one source of high quality position measurements is generating a stream of high quality position measurements, and wherein the high quality position measurement is unavailable if each source of high quality position measurements stops generating a stream of high quality measurements.

In one embodiment of the present invention, the step of using at least one high quality position measurement of the object for navigation purposes of the object further includes the steps of: periodically checking whether at least one high quality position measurement of the object is available and is substantially recent; and if at least two of the high quality position measurements of the object are available and are substantially recent, selecting a highest ranked high quality position measurement of the object having a highest rank, and using the highest ranked high quality position measurement of the object for navigation purposes.

The highest ranked high quality position is obtained by using a highest ranked source of high quality measurements, wherein the highest rank is selected from the group consisting of: {a highest frequency at which the high quality position measurements are provided; a lowest standard deviation of errors of the high quality position measurements; a lowest maximum expected error of the high quality position measurements; and a highest likelihood of availability of the high quality position measurements}.

If, on the other hand, at least one high quality position measurement of the object is unavailable, or is available but is not substantially recent, the method of the present invention further includes the steps of: of upgrading at least one low quality position measurement of the object by using the most recently saved high quality position measurement of the object; and using at least one upgraded low quality position measurement of the object in place of the of high quality position measurement of the object for navigation purposes, if the upgraded low quality position measurement of the object satisfies the threshold of acceptability requirement for the object.

In one embodiment of the present invention, the step of selecting the low quality source of position measurements of the object further includes the step of selecting a highest ranked low quality source of position measurements of the object. The highest ranked low quality source outputs at least one highest ranked low quality position measurement of the object, wherein the highest rank is selected from the group consisting of: {a longest substitution period; wherein the substitution period is a period of time during which each upgraded highest rank low quality position measurement is expected to satisfy the threshold of acceptability requirement; a lowest standard deviation of errors of the low quality position measurements during the substitution period; and a lowest maximum expected error of low quality position measurements during the substitution period}.

Yet, one more aspect of the present invention is directed to an apparatus for substituting at least one high quality position measurement with a set of upgraded low quality position measurements. In one embodiment, the apparatus comprises: a means for selecting a high quality source of position measurements of an object; a high quality source configured to obtain at least one high quality position measurement of the object; a means for saving at least one high quality position measurement of the object taken at at least one high quality epoch timing coordinate; a means for selecting a low quality source of position measurements of the object; a low quality source configured to obtain at least one low quality position measurement; and a processor.

In one embodiment of the present invention, the processor includes an algorithm comprising at least the following steps: (a) upgrading at least one low quality position measurement of the object by using at least one saved high quality position measurement of the object to obtain at least one upgraded low quality position measurement of the object; and (b) if each high quality position measurement of the object is unavailable, or is available, but is not substantially recent; and if each upgraded low quality position measurement of the object satisfies the threshold of acceptability requirement for the object, substituting at least one high quality measurement of the object with at least one upgraded low quality position measurement of the object.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a flowchart of the method for substituting at least one high quality position measurement with a set of upgraded low quality position measurements. In this embodiment, the assumption is that low quality measurements are always available.

FIG. 2 is a flowchart of the quality upgrade algorithm of the present invention.

FIG. 3 illustrates a flowchart of the method of the present invention for substituting at least one high quality position measurement with a set of upgraded low quality position measurements. In this embodiment, the assumption is that a source of high quality position measurements of an object is available and active, and a source of low quality measurements is available, but initially idle.

FIG. 4 depicts a flowchart of the method of the present invention for substituting at least one high quality position measurement with a set of upgraded low quality position measurements. In this embodiment, the assumption is that there is a hierarchy of high quality sources of measurements, and a hierarchy of low quality sources of measurements.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment of the present invention, FIG. 1 depicts a flowchart 10 of the method for substituting at least one high quality position measurement with a set of upgraded low quality position measurements. In this embodiment, the assumption is that low quality measurements are always available, wherein the high quality measurements are always available in the beginning of the measurement process, as shown in block 12.

A high quality measurement has an error that is lower than the threshold of acceptability. (See discussion below). On the other hand, a low quality measurement has an error that is either higher or lower than the threshold of acceptability. Typically, in the following discussion a low quality measurement is assumed (in the worst case scenario) to include an error that is higher than the threshold of acceptability.

At first, one needs to select a high quality source of position measurements of an object, as well as a low quality source of position measurements of the object.

At first we would like to address the issue of availability, as shown in the logical test condition 14 (of FIG. 1). In the present disclosure it is assumed that a high quality measurement (see discussion below) is available, if the source of high quality position measurements is generating a stream of high quality position measurements. If this is the case, the logical arrow 20 indicates the next step to the block 22 that indicates that the high quality position and velocity measurements are acceptable in terms of their quality, that is the "quality" flag is set as an "acceptable" one.

On the other hand, a high quality position measurement is unavailable if the source of high quality position measurements stops generating the stream of high quality measurements. If this is the case, the logical test condition 14 fails, the quality flag is set to be an unacceptable one (not shown), and the logical arrow 18 indicates the next step of the present method (see discussion below). The terms "acceptable" and "unacceptable" are defined based on the given navigation application of the measurement data. Thus, by tagging the data as acceptable or unacceptable, the function of the upgrade algorithm of the present invention (see discussion below) is performed.

A high quality source of position measurements of an object generates at least one high quality position measurement of the object including a high quality epoch timing coordinate indicative of when the high quality position measurement of the object was taken. A high quality position measurement of a given object includes an acceptable error, that is the high quality position measurement of the object satisfies a threshold of acceptability requirement for the given object. The threshold of acceptability is defined as a bound between an "acceptable" error in a position measurement of the object and an "unacceptable" error in the position measurement of the object.

In one embodiment of the present invention, the threshold of acceptability for position measurement errors for any given object is set to be a standard deviation of a set of position measurement errors taken over a statistically significant time period. In another embodiment of the present invention, the threshold of acceptability for position measurement errors for an object is set to be a maximum measurement error that is acceptable for a given navigation application of the object.

In one embodiment, the maximum measurement error that is acceptable for a given navigation application of the object can be determined as a measurement error that exceeds the threshold of acceptability for the object. In this embodiment, the maximum measurement error that is acceptable is set to be equal to the minimum (lowest) measurement error that exceeds the threshold of acceptability for the object. In one embodiment, the minimum/maximum measurement error can be determined by monitoring errors in the upgraded low quality position measurements of the object (please, see discussion below).

Referring still to FIG. 1, if the quality flag is set to be acceptable in 22, it also means also that the high quality position measurements of an object obtained by using a source of high quality measurements (see discussion below) are substantially recent. The high quality position measurements are substantially recent if a rate of updating the high quality position measurements is substantially sufficient to obtain a substantially recent position measurement of a dynamic object. Thus, the rate of updating R of high quality measurements should be high enough to obtain the position measurements of a dynamic object, having velocity V:

$$R \geq V/\delta;  \quad (1)$$

wherein $\delta$ is a maximum error of a high quality position measurement of the dynamic object.

A low quality source of position measurements of a given object generates at least one low quality position measurement of the object including a low quality epoch timing coordinate indicative of when at least one low quality position measurement of the object was taken. The low quality position measurement of the given object includes an unacceptable measurement error that does not satisfy the threshold of acceptability requirement for the given object.

In one embodiment of the present invention, for a given object, each source of high quality position measurements of the object has at least one complementary source of low quality position measurements that can be upgraded (please, see the discussion below) by using the source of high quality measurements. A source of high quality position measurements of a given object and an upgradable low quality position measurements can be combined into a pair.

In another embodiment of the present invention, one can take any two sources (a pair) of position measurements and define a source of measurements having a higher accuracy as a high quality source, wherein the second source would comprise a low quality position measurement source. However, in this approach, the lower accuracy source should have measurement errors that are correlated in time for the method of the present invention to be applicable. Thus, in this embodiment, the additional assumption is that a low quality source is a position measurement source, which has measurement errors that are correlated in time. The following measurement sources can be used as both high and low quality measurement sources, depending on the application.

EXAMPLE I

The Autonomous Satellite Positioning System includes a Satellite Positioning System—SATPS (GPS, Glonass, GNSS etc.), or a Terrestrial Radio Positioning or Navigation System (e.g. Loran, VOR/DME), or a Pseudolite Positioning System. The Autonomous Satellite Positioning System utilizes an Autonomous SATPS receiver—a position measurement device that measures the time it takes for signals to travel to it from each of several satellites. The time measurement is made by locking onto a code that the satellites send out at a carrier frequency, at a known time. The Autonomous SATPS receiver triangulates its own position by using the known travel times of the signal from each satellite.

EXAMPLE II

The Code Differential Satellite Positioning System includes a Differential GPS, or a differential Glonass, or a WAAS DGPS, or a differential GNSS etc. The Code Differential Satellite Positioning System uses a Code Differential SATPS receiver. The Code Differential SATPS receiver comprises a mobile Autonomous SATPS receiver, called the rover, and a stationary Autonomous SATPS receiver placed at a known reference position. The Code Differential SATPS receiver compares the position measurements calculated by the rover Autonomous SATPS receiver with the position measurements calculated by the stationary Autonomous SATPS receiver at a known reference position. Errors that are common to both receivers can be removed in this manner.

EXAMPLE III

The Carrier Differential SATPS uses a Carrier Differential SATPS receiver. The Carrier Differential SATPS receiver is similar to a code differential SATPS receiver. In the carrier differential SATPS, the rover receiver compares the phase of the carrier frequency of the signal sent to it from each satellite, with the phase measured at a second reference receiver at a known position. This is in addition to locking onto the code that the satellites sent out, as Autonomous SATPS receivers do. Errors that are common to both receivers can be removed with this method. The Carrier differential SATPS provides a higher accuracy position measurement than the code differential SATPS.

EXAMPLE IV

The Inertial Navigation System (INS) comprises a processor and sensors that measure linear acceleration (accelerometers) and/or sensors that measure rotational rate (gyroscopes). The outputs of these sensors of the INS are integrated by the processor to provide a position measurement as well as an attitude (orientation) measurement. The accuracy of the INS is characterized by the accuracy of its accelerometers and gyroscopes. The High Accuracy Inertial Navigation System (HAINS) uses high accuracy gyroscopes and accelerometers, whereas the Low Accuracy Inertial Navigation System (LAINS) utilizes low accuracy gyroscopes and accelerometers. High accuracy gyroscopes have a low drift and low noise in the measured angular rate, whereas low accuracy gyroscopes have a high drift and high noise in the measured angular rate. Similarly, high accuracy accelerometers have a low drift and low noise in the measured acceleration, and low accuracy accelerometers have a high drift and high noise in the measured acceleration. The Inertial Navigation System (INS) is usually used in a Kalman Filter (or other positioning filter) in combination with any other position measurement source, like Carrier Differential SATPS, Code Differential SATPS, or Autonomous SATPS.

The following examples of pairs of high and low quality position measurement sources are shown in Table I:

TABLE I

| High Quality Position Source | Low Quality Position Source |
|---|---|
| Carrier Differential SATPS | Code Differential SATPS |
| | Autonomous SATPS |
| | Low Accuracy Inertial Navigation System (LAINS) |
| Code Differential SATPS | Autonomous SATPS |
| | Low Accuracy Inertial Navigation System (LAINS) |
| Autonomous SATPS | Low Accuracy Inertial Navigation System (LAINS) |
| High Accuracy Inertial Navigation System (HAINS) | Carrier Differential SATPS |
| | Code Differential SATPS |
| | Autonomous SATPS |
| INS + Carrier Differential SATPS | Carrier Differential SATPS |
| | INS |
| | Code Differential SATPS |
| | Autonomous SATPS |
| INS + Differential SATPS | INS |
| | Differential SATPS |
| | Autonomous SATPS |
| INS + Autonomous SATPS | INS |
| | Autonomous SATPS |

Referring still to FIG. 1, after a high quality source of measurements is selected, and after at least one high quality position measurement of the object is obtained by using the selected high quality source, if the quality flag is set as acceptable in block 22, it means that (as was discussed above) the high quality position measurements of an object obtained by using the selected source of high quality measurements satisfy the threshold of acceptability requirement, and are also substantially recent.

In one embodiment of the present invention, the high quality position measurements obtained at at least one high quality epoch timing coordinate are saved (at step 24) in the memory block (not shown).

In this embodiment, as was stated above, the source of low quality position measurements is always available and is selected in such a way as to complement (according to Table I) the prior selected high quality source of position measurements of the object. At least one low quality position measurement of the object is obtained by using the selected low quality source, and also saved (at step 24) in the memory block (not shown).

If at least one high quality position measurement of the object is available and substantially recent, the high quality position measurements are outputted (step 26) and are used for navigation purposes of the object. Both high and low quality measurements include positions, velocities, statistics on position and velocity measurements etc., that is the typical information given by the standard GPS receiver. All statistics may not exist in all GPS receivers and/or in INS. One would preferably use all the available statistics because the more statistics are used the better the algorithm performs.

As long as the obtained and outputted high quality measurements have higher quality than threshold of acceptability, whereas the non-upgraded low quality measurements have lower quality than threshold of acceptability, only the high quality measurements are used for navigation of the object. However, the high quality measurements are not always available, or are not always substantially recent. If this is the case, one can still perform a periodic checking operation (not shown) to detect whether at least one high quality position measurement of the object is available and is substantially recent, so it can be used for navigation of the object.

However, if none of high quality position measurements of the object is available and is substantially recent, referring still to FIG. 1, the test condition 14 fails, that is the next step of the method of the present invention follows the logical arrow 18.

In one embodiment, the next step (16 of FIG. 1) of the method of the present invention is to upgrade at least one low quality position measurement of the object by using the quality upgrade algorithm 60, as depicted in FIG. 2, to obtain at least one upgraded low quality position measurement of the object. The quality upgrade algorithm comprises the following steps. First of all, the test condition 64 is checked, that is the test is performed to determine whether a set of correction terms is substantially available, or if the set of correction terms exists.

Correction terms are error estimates of the low quality measurements. They are to be subtracted from the low quality measurements in order to upgrade the low quality measurements. They are typically generated when the high quality measurements become unavailable, in order to use them to upgrade the low quality measurements.

Referring still to FIG. 2, if the answer to the question "whether the set of correction terms exists?" is yes, the next step is to follow the logical arrow 68 and to use the set of correction terms in order to compute the system quality metrics as shown in step 72.

However, the set of correction terms is typically cleared from memory block (not shown) or is set to zero. Thus, the set of correction terms needs to be computed (step 70 of FIG. 2) to use them to upgrade the low quality measurements and to further use the upgraded low quality measurements in place of high quality measurements until and when the high quality measurements become available again, or until the upgraded low quality measurement degrade over time to the extent that they can not be used for navigation purposes of the object.

There are various methods of computing the correction terms.

EXAMPLE 1
Computation of Correction Terms Using a Single Epoch
bp[n]=xl[n]−xh[n]
bv[n]=vl[n]−vh[n]

EXAMPLE 2
Computation of Correction Terms Using Two Different Epochs:
bv[n]=vl[n]−vh[n−1]
bp[n]=xl[n]−(xh[n−1]+vh[n−1]*dt[n])

EXAMPLE 3
Computation of Correction Terms by Filtering Correction Terms from Several Epochs.

Compute bp_raw[n] and bv_raw[n] using the method from Example 1 for several epochs, n, n−1, n−2, . . . n−m.

Also, store the computed filtered correction terms from the prior k epochs. Then, compute the correction terms as a linear combination of the previous correction terms:

$$bp[n]=a[0]*bp\_raw[n]+a[1]*bp\_raw[n-1]\ldots+a[m]*bp\_raw[n-m]+b[1]*bp[n-1]+b[2]*bp[n-2]+\ldots+b[k]*bp[n-k]$$

$$bv[n]=c[0]*bv\_raw[n]+c[1]*bv\_raw[n-1]+\ldots+c[m]*bv\_raw[n-m]+d[1]*bv[n-1]+d[2]*bv[n-2]+\ldots+d[k]*bv[n-k];$$

where a[i], b[i], c[i], d[i] are filter coefficients.

EXAMPLE 4
Extension to Mismatched Measurement Epochs.

These examples are also extendable to include situations in which the high and low quality measurements are performed at different times, with different periods. Example 2 is a simple case in which the period of measurement is the same, but the time at which the measurements were taken is different. Such cases make the math more complicated, but the fundamental ideas remain the same.

EXAMPLE 5
Higher Order Extensions

These examples describe measurements and the corresponding correction terms of position and velocity. That is they describe position and the $1^{st}$ derivative of position, if the measurements include the higher order derivatives of position such as acceleration ($2^{nd}$ derivative), jerk ($3^{rd}$ derivative), yank ($4^{th}$ derivative), etc. Then the corresponding correction terms are added to the correction equations. Herein:

xh[n]=high quality position at epoch n;

xl[n]=low quality position at epoch n;

vh[n]=high quality velocity at epoch n;

vl[n]=low quality velocity at epoch n;

bp[n]=position bias of low quality position at epoch n (position correction term at epoch n);

bv[n] velocity bias of low quality position at epoch n (velocity correction term at epoch n);

t[n] time at which the high or low quality position at epoch n was measured;

t[n]=nT;

dt[n]=t[n]−t[n−1].

Referring still to FIG. 2, either the existing correction terms are already available for further computation, or the correction terms are computed at step 70, as was disclosed above. At the next step 72, the correction terms are used to compute the system quality metrics System quality metrics taken together, indicate the accuracy of the upgraded low quality signal. Sometimes, it is not the metric itself, but a change in the metric that indicates a degradation in accuracy of the upgraded low quality signal.

Some examples of system quality metrics are:
(1) Time elapsed since the high quality measurements became unavailable
(2) Time elapsed since an update to the correction terms was made.
(3) The exact constellation of satellites used for the low quality GPS measurement.
(4) Dilution of Precision (DOP) of the low quality GPS measurement (derived from the constellation).
(5) Number of satellites in the constellation used for the low quality GPS measurement (derived from the constellation).
(6) Number of changes in satellite constellation used for the low quality GPS measurement, since the high quality measurements became unavailable (derived from a history of constellations used).
(7) Number of times the conditions on the metrics, described below, failed and required a re-computation of the correction terms.
(8) Changes in the measurements. e.g. the change in position from the prior epoch to the current epoch.
(9) Mismatch between a change in position and the expected change in position based on the measured velocity.

The testing condition 74 tests whether the computed correction terms are adequate, that is whether the upgraded low quality signal obtained by subtracting the correction terms from the low quality signal satisfies, or is expected to satisfy, the threshold of acceptability requirement for a given navigation application for a given object.

This first set of conditions on the system quality metrics determine whether or not the previously computed correction terms are still adequate for upgrading the low quality signal. This is a more stringent set of conditions than the second set of conditions which determine whether the Correction Terms can be made Adequate by updating them.

The correction terms are adequate, that is the testing condition 74 is passed, and the next step in the flowchart 60 of FIG. 2 follows the logical arrow 78, if the following statement 1 is true:

If the correction term was computed in the current epoch, then it is adequate

Statement 1

The correction terms are inadequate, that is the testing condition 74 fails, and the next step in the flowchart 60 of FIG. 2 follows the logical arrow 82, if any one of the following statements is true:

The time elapsed since the high quality measurements became unavailable is higher than some threshold.

Statement 2

The time elapsed since an update to the correction terms was made is higher than some threshold.

Statement 3

The DOP of the low quality GPS measurement changed from the previous epoch.

Statement 4

The satellite constellation used by the low quality GPS measurement changed from the previous epoch.

Statement 5

The position measured in the current epoch differs from the position measured in the previous epoch by an amount greater than some threshold.

Statement 6

The statement 6 can be extended to look at epoch to epoch differences of velocity, acceleration and any higher order terms being considered, and see if any of these are greater than an absolute threshold.

Statement 7

The mismatch between the change in position from the prior epoch, and the expected change in position based on measured velocity is greater than some threshold.

Statement 8

The previous statement 8 can be extended to measure a mismatch between a change in velocity from epoch to epoch and the measured acceleration, and similarly extended to comparing epoch to epoch differences of higher order derivatives of position.

Statement 9

Additional heuristic conditions can be added, or some of the statements (2–9) can be removed depending on the available system quality metrics.

Note that the statement 1 is true in the epoch in which the high quality signal became unavailable. If this is the case, the statements (2–9) that state the conditions to determine whether the correction terms are inadequate can be ignored, and the next step 90 in the flowchart 60 (of FIG. 2) follows the logical arrow 78. At step 90 the quality flag of the upgraded low quality measurements is set to be an acceptable one, and the low quality measurements are upgraded by subtracting the pre-computed correction terms at step 92. Typically, the correction terms are updated when the measurements "jump" due to a change in satellite constellations, or due to some other unknown reason.

EXAMPLE 6

The EXAMPLE 1 is used as the basis in this EXAMPLE 6.

$$bp[n]=bp[n-1]+(xl[n]-(xl[n-1]+vl[n-1]*dt[n]))$$

$$bv[n]=bv[n-1]+(vl[n]-vl[n-1])$$

EXAMPLE 7

The EXAMPLE 2 is used as the basis in this EXAMPLE 7.

Add a filtered version of xl[i] to bp[n−1] to give bp[n]. Similar for bv[n].

EXAMPLE 8

The EXAMPLE 3 is used as the basis in this EXAMPLE 8.

Add a filtered version of xl[i] and vl[i] to bp[i] to give bp[n]. Similar for bv[n].

EXAMPLE 9

The EXAMPLES 1, 2, and 3 with higher order terms added are used as the basis in this EXAMPLE 9.

EXAMPLE 10

Same as earlier examples, but designed to skip xl[n−1], vl[n−1], bp[n−1] etc. if an update was also performed in the prior epoch, and to use xl[n−2], vl[n−2], bp[n−2] instead.

EXAMPLE 11

Let the correction terms decay to zero.

$$bp[n]=bp[n-1]*\text{decayfactor}\_p$$

$$bv[n]=bv[n-1]*\text{decayfactor}\_v$$

et cetera for higher order terms.

Typically, the situation of the EXAMPLE 11 is done in conjunction with setting the measurement quality flag at step 84 to be an "Unacceptable" one. This would let the output 94 of the flowchart 60 to smoothly change over to non-upgraded low quality measurements, when it was determined that the correction terms generated by the upgrade algorithm 60 of FIG. 2 are no longer adequate, that is the test condition 74 fails.

If test condition 74 fails for any reason, the flowchart 60 of FIG. 2 follows the logical arrow 76, and the next test (80) is "Can the correction terms be made adequate ?"

In one embodiment of the present invention, it is sufficient to make the correction terms adequate by updating the correction terms (at step 88) based on the new system quality metrics computed at step 72. The updated (at step 88) correction terms are expected to be adequate and to be used at step 92 to upgrade the low quality measurements.

On the other hand, the updated correction terms are expected to be inadequate if any one of the following statements (10–13) is true:

The time elapsed since the high quality measurements became unavailable is higher than a threshold for the updated correction terms to be adequate.

Statement 10

The time elapsed since an update to the correction terms was made is higher than the threshold for the updated correction terms to be adequate.

Statement 11

The number of changes in satellite constellation used for the low quality GPS measurement, since the high quality measurements became unavailable is greater than the threshold for the updated correction terms to be adequate Statement 12

The number of times the correction terms have been recomputed, because the correction terms were deemed not to be Adequate, is greater the threshold for the updated correction terms to be adequate.

Statement 13

Additional heuristic conditions can be added, or some of the statements (10–13) can be removed depending on the available system quality metrics.

The threshold for the upgraded low quality measurement to be adequate used in statements (10–13) is related to the threshold of acceptability of measurements used above. Indeed, the threshold of acceptability of measurements is an accuracy level, based on the application for which the measurements are being used. For example, measurement errors on the order of 5 meters are perfectly acceptable for determining the position of a vehicle on a map, in order to direct the driver when to take a turn. However, measurement errors of 30 centimeters may be too large for some machine control applications. Thus, the threshold of acceptability is defined as a bound between an "acceptable" error in the measurement and an "unacceptable" error in the measurement. As was stated above, the threshold of acceptability can then be defined such as the maximum measurement error of an "acceptable" measurement, or as the standard deviation of the set of measurements.

Typically, one does not know what the error in the measurement is; because, otherwise, one would just subtract it out. Therefore, one has to determine by some method, often by some heuristics, the expected value of our measurement error, or the expected value of the mean square measurement error, or the lowest maximum expected error etc. In one embodiment, the method to determine the threshold of acceptability includes the upgrading algorithm (depicted in the flowchart 60 of FIG. 2) that indicates in step 82 that the quality of the upgraded measurements is insufficient, or that the quality flag is not acceptable, or that the upgraded low quality measurements are not adequate, and therefore the threshold of acceptability is exceeded. This establishes the relationship between the threshold for the upgraded low quality measurement to be adequate used in statements (10–13) with the threshold of acceptability.

Here is an example of a set of specific steps that can be used determine and enforce a threshold of acceptability in the upgraded algorithm 60 of FIG. 2:

EXAMPLE

Method of Establishing Relationship Between the Threshold of Acceptability and Threshold for Upgraded Low Quality Measurements to be Adequate 1. One should choose the maximum measurement error that a specific application can withstand;
2. One should run controlled tests of the upgrade algorithm 60 with loose thresholds on in the test block 80: "Whether the Correction Terms Can Be Made Adequate". In this scenario, one should force the unavailability of the high quality signal to the algorithm, though it is available for diagnostic purposes; and
3. One should monitor the errors in the upgraded low quality signals and come up with thresholds to use in the block 80 "Whether the Correction Terms Can Be Made Adequate" block, such that these thresholds are exceeded before the maximum allowable error in the upgraded low quality measurements is reached. Similarly, one should come up with thresholds to use in the block 74 "Whether the Correction Terms are Adequate", such that these thresholds are exceeded before the maximum allowable error in the upgraded low quality measurements is reached. Thus, one would use the thresholds in the blocks that determine whether the upgraded position will be "Adequate" to act as a proxy for the threshold of acceptability. When those thresholds are exceeded, one would expect that the threshold of acceptability for the measurement error has also been exceeded. Since one has no direct way of knowing the measurement error, one could use this proxy to determine whether the upgraded low quality measurements are usable in the given application.

Referring still to FIG. 2, if the upgraded low quality measurements satisfy the threshold for the updated correction terms to be adequate, they can be used in place of high quality measurements that do not satisfy the threshold of acceptability requirement (step 94). However, the stream of the upgraded low quality position measurements of the object degrades over time. Therefore, even if initially the upgraded low quality position measurements satisfy the threshold for the updated correction terms to be adequate, over time, the upgraded low quality position measurements degrade to the extent that they do not longer satisfy the threshold for the updated correction terms to be adequate. If this is the case, the low quality position correction terms can be updated again (step 88) to accommodate in changes in the system quality metrics. The steps (62–94) of the upgrade algorithm 60 of FIG. 2 are preferably repeated for each new low quality measurement that can be updated to compensate for degradation.

If, on the other hand, at least one low quality position measurement is degraded to the extent that the correction term can not be updated again (step 88) to accommodate for changes in the system quality metrics, and therefore can not be upgraded, one should stop using the source of low quality (not-upgradable anymore) measurements for navigation of the object. If there is more than one source of low quality measurement available, the method of the present invention still can be used. Please, see discussion below.

In one embodiment, wherein a source of high quality position measurements of an object is available and active, and wherein a source of low quality measurements is available, but initially idle, FIG. 3 depicts a flowchart 100 of the method of the present invention. The method 100 of FIG. 3 is substantially the same as the method 10 of FIG. 1 and is not disclosed herein in all details to avoid redundancy. Instead, only the main steps of method 100 of FOG. 3 are outlined herein. All gaps in disclosure of flowchart 100 are filled by incorporating herein the given-above disclosure of flowchart 10 of FIG. 1.

In one embodiment, as shown in flowchart 100 of FIG. 3, the method for substituting at least one high quality position measurement with a set of upgraded low quality position measurements comprises the following steps: (step 102) selecting and inputting a high quality source of position measurements of an object; (test condition 104) testing whether each high quality position measurement of the object satisfies a threshold of acceptability requirement for the object; (step 116) if the answer in the test (104) is yes, setting the quality flag as an acceptable one, (step 118) saving at least one high quality position measurement of the object taken at at least one high quality epoch timing coordinate, and (step 120) using at least one high quality position measurement of the object for navigation purposes of the object.

If, on the other hand, test condition (104) fails, that is each high quality position measurement of the object is unavailable, or is available but is not substantially recent, the flow chart 100 of FIG. 3 follows the logical arrow (107), and the next step (106) is to select a low quality source of position measurements of the object and to obtain at least one low quality position measurement of the object using the low quality source; wherein at least one low quality position measurement of the object includes a low quality epoch timing coordinate indicative of when at least one low quality position measurement of the object was taken.

The assumption is that each low quality position measurement of the object does not necessarily satisfy the threshold of acceptability requirement for the object. Thus, the next step (108) is to apply the quality upgrade algorithm (60 of FIG. 2) and to upgrade at least one low quality measurement of the object by using at least one high quality position measurement of the object to obtain at least one upgraded low quality position measurement of the object. If the quality flag is set to be an acceptable one (test condition 110), then the next step (114) is to output and to use at least one upgraded low quality position measurement of the object in place of at least one high quality position measurement of the object for navigation purposes.

The upgraded low quality measurements degrade over time and loose quality, so that at some point in time the upgraded low quality measurements cease to satisfy the threshold of acceptability requirement, that is they are not useful for navigation purposes anymore. If this is the case, the test condition 110 fails and the output is classified as an unacceptable one (according to block 112). If this is the case, one should stop using the upgraded low quality position measurements of the object for navigation purposes.

In one embodiment, the correction terms in the quality upgrade algorithm can be updated (block 88 of FIG. 2) to accommodate the re-computed system quality metrics. In this embodiment, the method of present invention further includes the step of periodically checking whether at least one upgraded low quality position measurement of the object is available and is substantially recent, and whether the quality flag associated with that measurement is an acceptable one. If at least one upgraded low quality position measurement of the object is available and is substantially recent, that is the test condition 110 is satisfied, then, at least one upgraded low quality position measurement of the object can be used for navigation purposes.

In one embodiment, FIG. 4 depicts a flowchart 140 of the method of the present invention for substituting at least one high quality position measurement with a set of upgraded low quality position measurements. In this embodiment, the assumption is that there is a hierarchy of high quality sources of measurements, and that there is a hierarchy of low quality sources of measurements.

Hierarchy of Sources of Low Quality Measurements

As was stated above, the Low quality measurements are measurements whose quality is lower than the threshold of acceptability for a given application. Low quality measurements are ordered based on how correlated in time the errors in the measurements are. This means that measurements whose errors are highly correlated in time are "better" low quality measurements for this algorithm than measurements whose errors are not as correlated in time. One way to characterize this is to measure the standard deviation of the errors. A source of measurement whose standard deviation of errors is low is a better source than one whose standard deviation of errors is high. These errors should be measured over "short" periods time, i.e. for the duration of time that the upgrading algorithm is expected to function.

Comparison of Autonomous GPS Position Measurements with DGPS Position Measurements.

The mean value of the error of the autonomous position measurements is higher than the mean value of the error of the DGPS position measurements. However, provided there are no satellite constellation changes, the standard deviation of the error of the autonomous position measurements is lower than the standard deviation of the error of DGPS position measurements. Therefore, autonomous position measurements are "better" low quality measurements compared to DGPS measurements for the purposes of the upgrade algorithm (60 of FIG. 2) of the present invention. This is true provided the measurements are taken over short time periods—between 30 seconds and 60 seconds. For long periods, between 10 minutes and 30 minutes, DGPS measurements will have a lower standard deviation of error than autonomous positions, and therefore DGPS measurements will be the "better" low quality measurement for the purposes of the upgrade algorithm.

Thus, a hierarchy of low quality measurements can be obtained by performing the following steps:

Step 1. Determining a set of low quality sources to be compared.

Step 2. Determining the period that the upgraded low quality measurement is expected to substitute effectively for the high quality measurement. One could call this period a substitution period.

Step 3. Determining the standard deviation of error in the substitution period, for each of the low quality measurement sources chosen in step 1. One-time errors such as large jumps in position due to satellite constellation changes in GPS (SATPS) can be ignored for this calculation. This is because the upgrading algorithm can detect such jumps and remove them.

Step 4. Ordering the measurement sources from smallest to largest standard deviation of error for the desired substitution period.

Step 5. Verifying that the best low quality measurement source selected in step 4, can satisfy the required threshold of acceptability, for the desired substitution period determined in step 2. This is to verify that the substitution period determined in step 2 is realistic, for the best measurement source from the set selected in step 1. In case this verification step cannot be satisfied, reduce the desired substitution period in step 2, or add a better low quality measurement source to the set in step 1, and repeat the process.

Hierarchy of High Quality Measurements

As was stated above, the high quality measurements are measurements whose quality is higher than the threshold of acceptability for s given application.

A high quality source of measurement is expected to provide high quality output indefinitely. Thus, the limitation of standard deviation of error "for a given period", that was used in describing low quality measurements, does not apply for a high quality measurement source.

High quality sources of measurements can be ranked according to some appropriate accuracy criterion that is dependent on the application. Some examples of these criteria are:

1. Standard deviation of error of the high quality measurements.
2. Lowest maximum expected error of the high quality measurements.
3. Frequency at which the high quality measurements are provided.
4. Availability of the high quality position measurements; i.e. lower "downtime" of the high quality position measurements.

The method 140 of FIG. 4 is substantially the same as the method 10 of FIG. 1 and is not disclosed herein in all details to avoid redundancy. Instead, only the main steps of method 140 of FIG. 4 are outlined herein. All gaps in disclosure of flowchart 140 are filled by incorporating herein the given-above disclosure of flowchart 10 of FIG. 1.

Referring still to FIG. 4, in one embodiment, the method of the present invention comprises the following steps: (step 142) selecting the best ranked high quality source of position measurements of an object that satisfies the threshold of acceptability requirement for the object (test 144 is satisfied), obtaining at least one high quality position measurement of the object by using best ranked high quality source; and (step 148) saving at least one high quality position measurement of the object obtained by the best ranked high quality source.

In one embodiment of the present invention, if at least two of the high quality position measurements of the object are available and are substantially recent, a highest ranked high quality source of position measurement of the object is selected by using one of the following parameters: {a highest frequency at which the high quality position measurements are provided; a lowest standard deviation of errors of the high quality position measurements; a lowest maximum expected error of the high quality position measurements; and/or a highest likelihood of availability of the high quality position measurements}.

Referring still to FIG. 4, if even the worst ranked high quality source of position measurements of an object does not satisfy the threshold of acceptability requirement for the object (test 144 fails), the method 140 of FIG. 4 comprises the following steps: (step 142) selecting at least one low quality source of position measurements of the object, and obtaining the low quality position measurement of the object by using each low quality source; (steps 156–160) upgrading by using an upgrade algorithm (60 of FIG. 2) each low quality position measurement of the object by using the most recently saved best ranked high quality position measurement of the object to obtain a plurality of upgraded low quality position measurements of the object; and if test (162) of acceptability is satisfied for at least one upgraded low quality position measurement of the object, (step 166) outputting the upgraded low quality position measurement of the object that satisfies the threshold of acceptability requirement for the object.

If test (162) of acceptability is satisfied for more than one upgraded low quality position measurement of the object, one needs to select the best ranked low quality source to output the best ranked upgraded low quality position measurements of the object that satisfy the threshold of acceptability requirement for the object.

In one embodiment of the present invention, a highest rank low quality source of position measurement of the object is selected by using one of the following parameters: {a longest substitution period; wherein the substitution period is a period of time during which each upgraded highest rank low quality position measurement is expected to satisfy the threshold of acceptability requirement; a lowest standard deviation of errors of the low quality position measurements during the substitution period; and a lowest maximum expected error of low quality position measurements during the substitution period}.

Yet, one more aspect of the present invention is directed to an apparatus for substituting at least one high quality position measurement with a set of upgraded low quality position measurements. In one embodiment, the apparatus (not shown) comprises: (A) a means for selecting a high quality source of position measurements of an object; (B) a high quality source configured to obtain at least one high quality position measurement of the object; (C) a means for saving at least one high quality position measurement of the object taken at at least one high quality epoch timing coordinate; (D) a means for selecting a low quality source of position measurements of the object; (E) a low quality source configured to obtain at least one low quality position measurement; and (F) a processor.

In one embodiment of the present invention, the processor (not shown) includes an algorithm comprising at least the following steps: (a) upgrading at least one low quality position measurement of the object by using at least one saved high quality position measurement of the object to obtain at least one upgraded low quality position measurement of the object; and (b) if each high quality position measurement of the object is unavailable, or is available, but is not substantially recent; and if at least one upgraded low quality position measurement of the object satisfies the threshold of acceptability requirement for the object; substituting at least one high quality measurement of the object with at least one upgraded low quality position measurement of the object.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for substituting at least one high quality position measurement with a set of upgraded low quality position measurements, said method comprising the steps of:

(A1) selecting a high quality source of position measurements of said object from a group of high quality sources;

(A2) obtaining at least one high quality position measurement of said object obtained by using said high quality source;

(B) saving said at least one high quality position measurement of said object;

(C) obtaining at least one low quality position measurement of said object using a low quality source;

(D) if said at least one high quality position measurement of said object is of substantially high quality, using said at least one high quality position measurement of said object for navigation purposes of said object;

(E) if each said high quality position measurement of said object is not of substantially high quality, and if each said low quality position measurement of said object is not of substantially high quality, upgrading said at least one low quality position measurement of said object by using said at least one high quality position measurement of said object to obtain at least one upgraded low quality position measurement of said object; and (F) using said at least one upgraded low quality position measurement of said object in place of said at least one high quality position measurement of said object for navigation purposes, if each said upgraded low quality position measurement of said object is of substantially high quality;

wherein said at least one high quality position measurement of said object includes a high quality epoch timing coordinate indicative of when said high quality position measurement of said object was taken, and wherein said high quality position measurement of said object is of said high quality if said high quality position measurement of said object includes an acceptable error in said high quality position measurement of said object and is substantially recent, and wherein each said high quality position measurement of said object is of said high quality if said high quality position measurement of said object satisfies a threshold of acceptability requirement for said object, and wherein the threshold of acceptability is defined as a bound between said acceptable error in a position measurement of said object and an unacceptable error in said position measurement of said object, and wherein said high quality position measurement is substantially recent if a rate of updating said high quality position measurement is substantially sufficient to obtain a substantially accurate position measurement of said object.

2. The method of claim 1, wherein said (C) of obtaining at least one low quality position measurement of said object using said low quality source further includes the steps of:
   (C1) selecting said low quality source of position measurements of said object from a group of low quality sources; and
   (C2) obtaining at least one low quality position measurement of said object using said low quality source;
   wherein said at least one low quality position measurement of said object includes a low quality epoch timing coordinate indicative of when said at least one low quality position measurement of said object was taken;
   and wherein said low quality position measurement of said object is not of said substantially high quality if said low quality position measurement of said object includes said unacceptable error in said low quality position measurement of said object, or is not substantially recent.

3. The method of claim 2, wherein said (C1) of selecting said low quality source of position measurements of said object further includes the step of:
   providing said low quality source of position measurements selected from the group consisting of:
   {a carrier differential SATPS; a code differential SATPS; an autonomous SATPS; and an Inertial Navigation System (INS) having a low accuracy (LAINS)}.

4. The method of claim 1, wherein said step (F) of using said at least one upgraded low quality position measurement of said object in place of said at least one high quality position measurement of said object for navigation purposes further includes the step of:
   (F1) checking whether said upgraded low quality position measurement of said object includes said acceptable error in said upgraded low quality position measurement of said object and is substantially recent.

5. The method of claim 1 further including the step of:
setting said position measurements threshold of acceptability for said object.

6. The method of claim 1 further including the step of:
setting said position measurements threshold of acceptability for said object to be a standard deviation of a set of position measurement errors taken over a statistically significant time period.

7. The method of claim 1 further including the step of:
setting said position measurements threshold of acceptability for said object to be a maximum measurement error that is acceptable for a given navigation application of said object.

8. The method of claim 7, wherein said step of setting said position measurements threshold of acceptability for said object to be said maximum measurement error that is acceptable for said given navigation application of said object further includes the step of:
   determining said maximum measurement error that is acceptable for said given navigation application of said object.

9. The method of claim 8, wherein said step of determining said maximum measurement error further includes the step of:

determining a largest measurement error that is less then said threshold of acceptability for said object, and setting said maximum measurement error to be equal to said largest measurement error that is less then said threshold of acceptability for said object.

10. The method of claim 9, wherein said step of determining said largest measurement error that is less then said threshold of acceptability for said object further includes the step of:
   monitoring errors in said upgraded low quality position measurements of said object.

11. The method of claim 1, wherein said step (A1) of selecting said high quality source of position measurements further includes the step of:
   providing said high quality source of position measurements selected from the group consisting of:
   {a carrier differential SATPS; a code differential SATPS; an autonomous SATPS; an Inertial Navigation System (INS) having a high accuracy (HAINS); a high quality source including said HAINS and said carrier differential SATPS; a high quality source including said HAINS and said code differential SATPS; and a high quality source including said HAINS and said autonomous SATPS}.

12. The method of claim 1, wherein said step (E) of upgrading said at least one low quality position measurement of said object by using said at least one high quality position measurement of said object to obtain said at least one upgraded low quality position measurement of said object further includes the steps of:
   (E1) if a set of correction terms is substantially unavailable, computing said set of correction terms; wherein said set of correction terms comprises a set of error estimates of said at least one low quality position measurement;
   (E2) if said set of correction terms is substantially available, computing at least one system quality metric; wherein each said system quality metric indicates whether or not said set of correction terms is substantially adequate for upgrading purposes;
   (E3) if each said system quality metric indicates that said set of correction terms is substantially adequate for upgrading purposes; setting a flag indicating said, set of correction terms is substantially adequate for upgrading purposes, using said set of correction terms to upgrade said at least one low quality position measurement of said object to obtain said at least one upgraded low quality position measurement of said object, and outputting said at least one upgraded low quality position measurement of said object;
   (E4) if at least one said system quality metric indicates that said set of correction terms is substantially inadequate for upgrading purposes, setting a flag indicating said set of correction terms is substantially inadequate for upgrading purposes, and checking whether said set of correction terms can be updated to become substantially adequate for upgrading purposes;
   (E5) if said set of correction terms is updatable to become substantially adequate for upgrading purposes; updating said set of correction terms, using said set of updated correction terms to upgrade said at least one low quality position measurement of said object to obtain said at least one upgraded low quality position measurement of said object, and, outputting said at least one upgraded low quality position measurement of said object; and
   (E6) repeating said steps (E1–E5) for each next epoch of a low quality position measurements of said object when said high quality source of said high quality position measurements of said object is unavailable, or is available but is not substantially recent.

13. A method for substituting at least one high quality position measurement with a set of upgraded low quality position measurements, said method comprising the steps of:

(A1) selecting a high quality source of position measurements of said object from a group of high quality sources;

(A2) obtaining at least one high quality position measurement of said object obtained by using said high quality source;

(B) saving said at least one high quality position measurement of said object;

(C) if said at least one high quality position measurement of said object is of substantially high quality, using said at least one high quality position measurement of said object for navigation purposes of said object;

(D) if each said high quality position measurement of said object is not of substantially high quality, obtaining at least one low quality position measurement of said object using a low quality source;

(E) if each said low quality position measurement of said object is not of substantially high quality, upgrading said at least one low quality position measurement of said object by using said at least one high quality position measurement of said object to obtain at least one upgraded low quality position measurement of said object; and (F) using said at least one upgraded low quality position measurement of said object in place of said at least one high quality position measurement of said object for navigation purposes, if each said upgraded low quality position measurement of said object is of substantially high quality, wherein said at least one high quality position measurement of said object includes a high quality epoch timing coordinate indicative of when said high quality position measurement of said object was taken, and wherein said high quality position measurement of said object is of said high quality if said high quality position measurement of said object includes an acceptable error in said high quality position measurement of said object and is substantially recent, and wherein each said high quality position measurement of said object is of said high quality if said high quality position measurement of said object satisfies a threshold of acceptability requirement for said object, and wherein the threshold of acceptability is defined as a bound between said acceptable error in a position measurement of said object and an unacceptable error in said position measurement of said object, and wherein said high quality position measurement is substantially recent if a rate of updating said high quality position measurement is substantially sufficient to obtain a substantially accurate position measurement of said object.

14. The method of claim 13, wherein said (D) of obtaining at least one low quality position measurement of said object using said low quality source further includes the steps of:

(D1) selecting said low quality source of position measurements of said object from a group of low quality sources; and (D2) obtaining at least one low quality position measurement of said object using said low quality source;

wherein said at least one low quality position measurement of said object includes a low quality epoch timing coordinate indicative of when said at least one low quality position measurement of said object was taken;

and wherein said low quality position measurement of said object is not of said substantially high quality if said low quality position measurement of said object includes said unacceptable error in said low quality position measurement of said object, or is not substantially recent.

15. The method of claim 13, wherein said step (F) of using said at least one upgraded low quality position measurement of said object in place of said at least one high quality position measurement of said object for navigation purposes further includes the step of:

(F1) checking whether said upgraded low quality position measurement of said object includes said acceptable error in said upgraded low quality position measurement of said object and is substantially recent.

16. The method of claim 13 further including the step of:
setting said position measurements threshold of acceptability for said object.

17. The method of claim 13 further including the step of:
setting said position measurements threshold of acceptability for said object to be a standard deviation of a set of position measurement errors taken over a statistically significant time period.

18. The method of claim 13 further including the step of:
setting said position measurements threshold of acceptability for said object to be a maximum measurement error that is acceptable for a given navigation application of said object.

19. The method of claim 18, wherein said step of setting said position measurements threshold of acceptability for said object to be said maximum measurement error that is acceptable for said given navigation application of said object further includes the step of:
determining said maximum measurement error that is acceptable for said given navigation application of said object.

20. The method of claim 19, wherein said step of determining said maximum measurement error further includes the step of:
determining a largest measurement error that is less then said threshold of acceptability for said object, and setting said maximum measurement error to be equal to said largest measurement error that is less then said threshold of acceptability for said object.

21. The method of claim 20, wherein said step of determining said largest measurement error that is less then said threshold of acceptability for said object further includes the step of:
monitoring errors in said upgraded low quality position measurements of said object.

22. The method of claim 13, wherein said step (A1) of selecting said high quality source of position measurements further includes the step of:
providing said high quality source of position measurements selected from the group consisting of:
{a carrier differential SATPS; a code differential SATPS; an autonomous SATPS; an Inertial Navigation System (INS) having a high accuracy (HAINS); a high quality source including said HAINS and said carrier differential SATPS; a high quality source including said HAINS and said code differential SATPS; and a high quality source including said HAINS and said autonomous SATPS}.

23. The method of claim 14, wherein said (D1) of selecting said low quality source of position measurements of said object further includes the step of:
  providing said low quality source of position measurements selected from the group consisting of:
  {a carrier differential SATPS; a code differential SATPS; an autonomous SATPS; and an Inertial Navigation System (INS) having a low accuracy (LAINS)}.

24. The method of claim 13, wherein said step (E) of upgrading said at least one low quality position measurement of said object by using said at least one high quality position measurement of said object to obtain said at least one upgraded low quality position measurement of said object further includes the steps of:
  (E1) if a set of correction terms is substantially unavailable, computing said set of correction terms; wherein said set of correction terms comprises a set of error estimates of said at least one low quality position measurement;
  (E2) if said set of correction terms is substantially available, computing at least one system quality metric; wherein each said system quality metric indicates whether or not said set of correction terms is substantially adequate for upgrading purposes;
  (E3) if each said system quality metric indicates that said set of correction terms is substantially adequate for upgrading purposes; setting a flag indicating said set of correction terms is substantially adequate for upgrading purposes, using said set of correction terms to upgrade said at least one low quality position measurement of said object to obtain said at least one upgraded low quality position measurement of said object, and outputting said at least one upgraded low quality position measurement of said object;
  (E4) if at least one said system quality metric indicates that said set of correction terms is substantially inadequate for upgrading purposes, setting a flag indicating said set of correction terms is substantially inadequate for upgrading purposes, and checking whether said set of correction terms can be updated to become substantially adequate for upgrading purposes;
  (E5) if said set of correction terms is updatable to become substantially adequate for upgrading purposes; updating said set of correction terms, using said set of updated correction terms to upgrade said at least one low quality position measurement of said object to obtain said at least one upgraded low quality position measurement of said object, and outputting said at least one upgraded low quality position measurement of said object; and
  (E6) repeating said steps (E1–E5) for each next epoch of a low quality position measurements of said object when said high quality source of said high quality position measurements of said object is unavailable, or is available but is not substantially recent.

25. A method for substituting at least one high quality position measurement with a set of upgraded low quality position measurements, said method comprising the steps of:
  (A1) selecting at least one said high quality source of position measurements of said object from a group of high quality sources;
  (A2) obtaining at least one high quality position measurement of said object obtained by using at least one said high quality source;
  (B) saving said at least one high quality position measurement of said object;
  (C) obtaining at least one low quality position measurement of said object using at least one low quality source;
  (D) if said at least one high quality position measurement of said object is of substantially high quality, using said at least one high quality position measurement of said object for navigation purposes of said object;
  (E) if each said high quality position measurement of said object is not of substantially high quality, upgrading said at least one low quality position measurement of said object by using said at least one high quality position measurement of said object to obtain at least one upgraded low quality position measurement of said object; and
  (F) using said at least one upgraded low quality position measurement of said object in place of said at least one high quality position measurement of said object for navigation purposes, if each said upgraded low quality position measurement of said object is of substantially high quality,
  wherein said at least one high quality position measurement of said object includes a high quality epoch timing coordinate indicative of when said high quality position measurement of said object was taken,
  and wherein said high quality position measurement of said object is of said high quality if said high quality position measurement of said object includes an acceptable error in said high quality position measurement of said object and is substantially recent,
  and wherein each said high quality position measurement of said object is of said high quality if said high quality position measurement of said object satisfies a threshold of acceptability requirement for said object,
  and wherein the threshold of acceptability is defined as a bound between said acceptable error in a position measurement of said object and an unacceptable error in said position measurement of said object,
  and wherein said high quality position measurement is substantially recent if a rate of updating said high quality position measurement is substantially sufficient to obtain a substantially accurate position measurement of said object.

26. The method of claim 25, wherein said (C) of obtaining at least one low quality position measurement of said object using at least one said low quality source further includes the steps of:
  (C1) selecting said at least one low quality source of position measurements of said object from a group of low quality sources; and
  (C2) obtaining at least one low quality position measurement of said object using said low quality source;
  wherein said at least one low quality position measurement of said object includes a low quality epoch timing coordinate indicative of when said at least one low quality position measurement of said object was taken;
  and wherein said low quality position measurement of said object is not of said substantially high quality if said low quality position measurement of said object includes said unacceptable error in said low quality position measurement of said object, or is not substantially recent.

27. The method of claim 26, wherein said (C1) of selecting said low quality source of position measurements of said object further includes the step of:
  providing said low quality source of position measurements selected from the group consisting of:

{a carrier differential SATPS; a code differential SATPS; an autonomous SATPS; and an Inertial Navigation System (INS) having a low accuracy (LAINS)}.

28. The method of claim 26, wherein said (C1) of selecting said low quality source of position measurements of said object further includes the step of:

selecting a highest ranked low quality source of position measurements of said object from a group of low quality sources;

wherein said highest ranked low quality source outputs at least one highest ranked low quality position measurement of said object;

and wherein a highest rank is selected from the group consisting of;

{a longest substitution period; wherein said substitution period is a period of time during which each said upgraded highest rank low quality position measurement is expected to satisfy said threshold of acceptability requirement; a lowest standard deviation of errors of said low quality position measurements during said substitution period; and a lowest maximum expected error of low quality position measurements during said substitution period}.

29. The method of claim 25, wherein said step (A1) of selecting said high quality source of position measurements further includes the step of:

providing said high quality source of position measurements selected from the group consisting of;

{a carrier differential SATPS; a code differential SATPS; an autonomous SATPS; an Inertial Navigation System (INS) having a high accuracy (HAINS); a high quality source including said HAINS and said carrier differential SATPS; a high quality source including said HAINS and said code differential SATPS; and a high quality source including said HAINS and said autonomous SATPS}.

30. The method of claim 25, wherein said step (E) of upgrading said at least one low quality position measurement of said object by using said at least one high quality position measurement of said object further includes the step of:

(E1) upgrading said at least one low quality position measurement of said object by using the most recently saved high quality position measurement of said object.

31. The method of claim 30, wherein said step (E1) of upgrading said at least one low quality position measurement of said object by using said at least one most recently saved high quality position measurement of said object to obtain at least one upgraded low quality position measurements of said object further includes the step of:

using a quality upgrade algorithm.

32. The method of claim 31, wherein said step of using said quality upgrade algorithm further includes the steps of:

(1) if a set of correction terms is substantially unavailable, computing said set of correction terms; wherein said set of correction terms comprises a set of error estimates of said at least one low quality position measurement;

(2) if said set of correction terms is substantially available, computing at least one system quality metric; wherein each said system quality metric indicates whether or not said set of correction terms is substantially adequate for upgrading purposes;

(3) if each said system quality metric indicates that said set of correction terms is substantially adequate for upgrading purposes; setting a flag indicating said set of correction terms is substantially adequate for upgrading purposes, using said set of correction terms to upgrade said at least one low quality position measurement of said object to obtain said at least one upgraded low quality position measurement of said object, and outputting said at least one upgraded low quality position measurement of said object;

(4) if at least one said system quality metric indicates that said set of correction terms is substantially inadequate for upgrading purposes, setting a flag indicating said set of correction terms is substantially inadequate for upgrading purposes, and checking whether said set of correction terms can be updated to become substantially adequate for upgrading purposes;

(5) if said set of correction terms is updatable to become substantially adequate for upgrading purposes; updating said set of correction terms, using said set of updated correction terms to upgrade said at least one low quality position measurement of said object to obtain said at least one upgraded low quality position measurement of said object, and outputting said at least one upgraded low quality position measurement of said object; and (6) repeating said steps (1–5) for each next epoch of a low quality position measurements of said object when said high quality source of said high quality position measurements of said object is unavailable, or is available but is not substantially recent.

33. The method of claim 31, wherein said step of using said quality upgrade algorithm further includes the steps of:

(A) using said quality upgrade algorithm for each said low quality source in a group of low quality sources; and (B) selecting a highest ranked low quality source in said group of low quality sources.

34. The method of claim 33 further including the step of:

(C) if said highest ranked low quality source outputs an upgraded low quality measurement that does not satisfy the threshold of acceptability or is not substantially recent; eliminating said highest ranked low quality source from said group of tow quality sources, and repeating said steps (B–C).

35. The method of claim 25, wherein said step (E) of upgrading said at least one low quality position measurement of said object by using said at least one high quality position measurement of said object further includes the step of:

(E2) upgrading said at least one low quality position measurement of said object by using the most recently saved highest ranked high quality position measurement of said object.

* * * * *